May 3, 1932. F. L. SCHOEL 1,856,511
ADJUSTABLE DOUGH DISPENSING MACHINE
Filed June 15, 1931 2 Sheets-Sheet 1
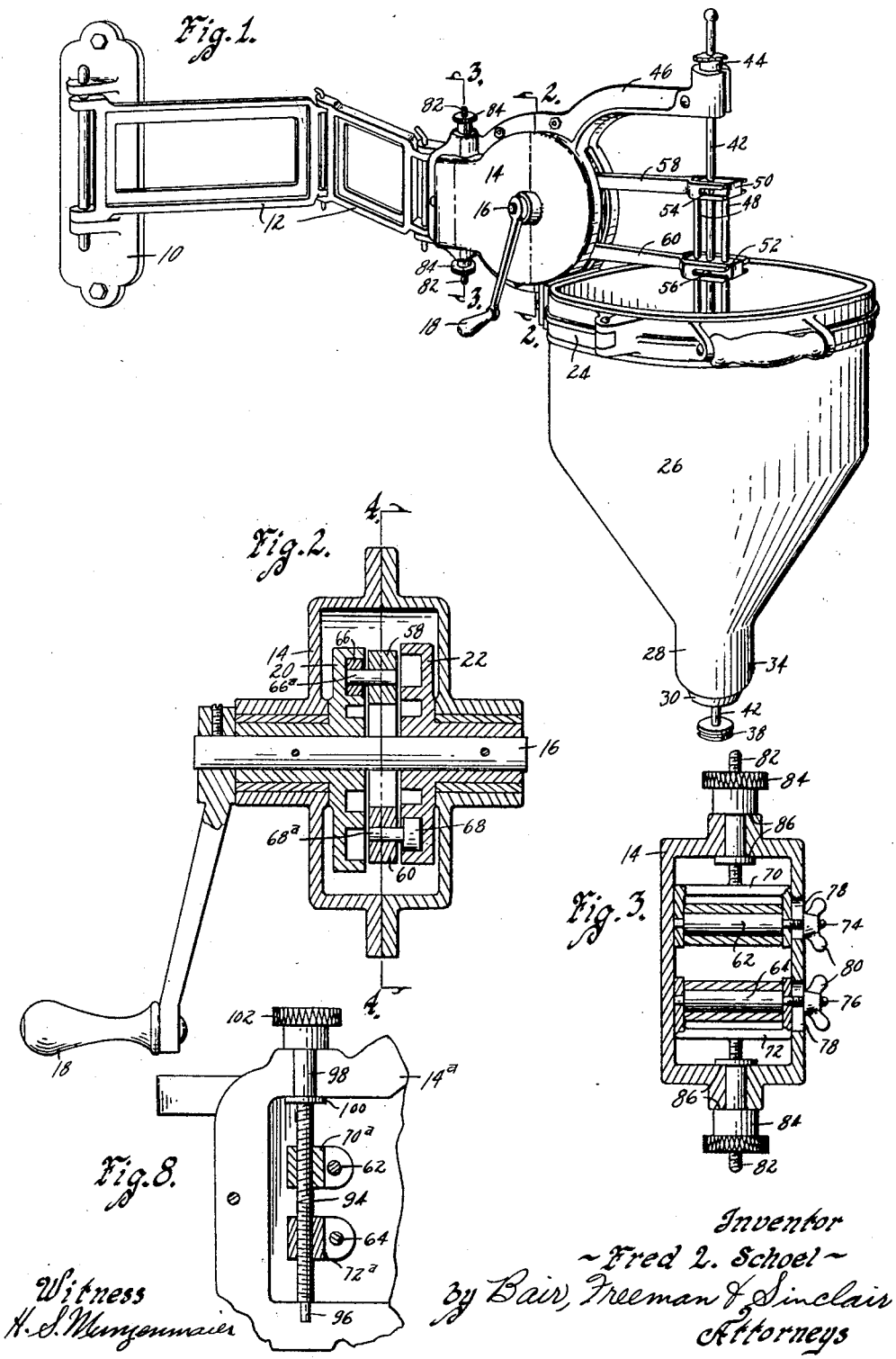

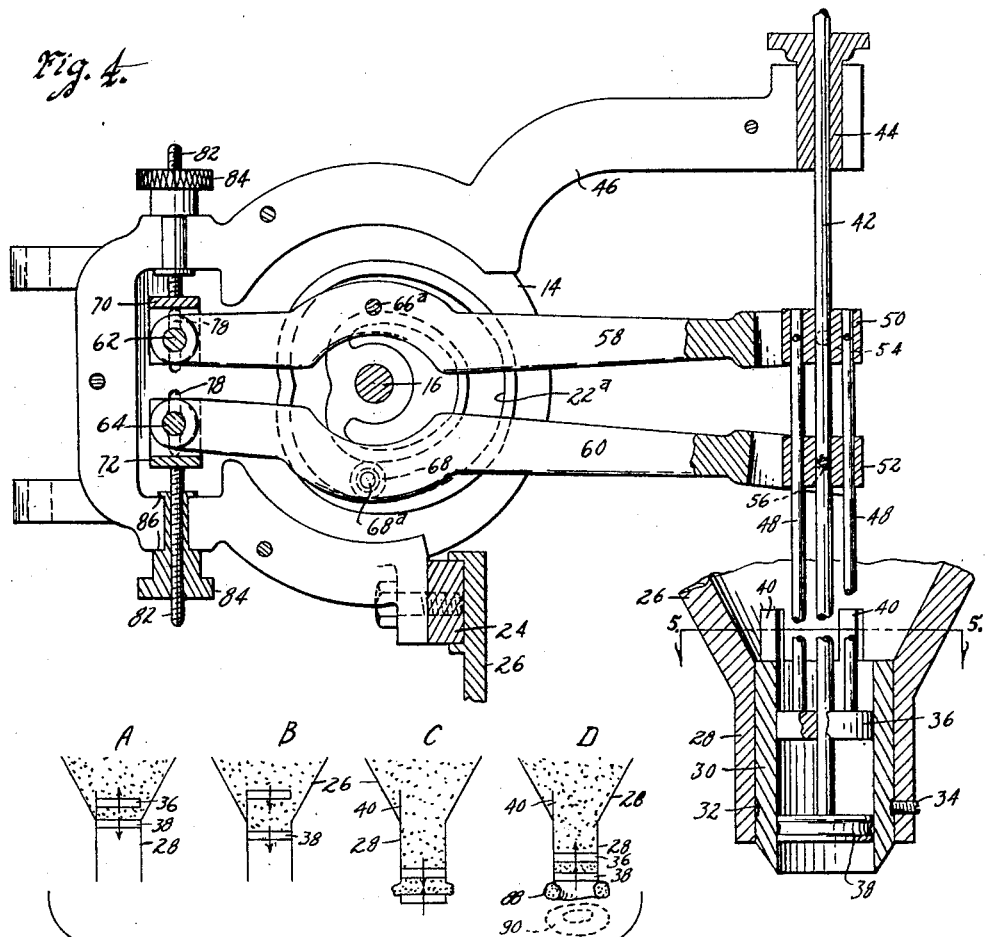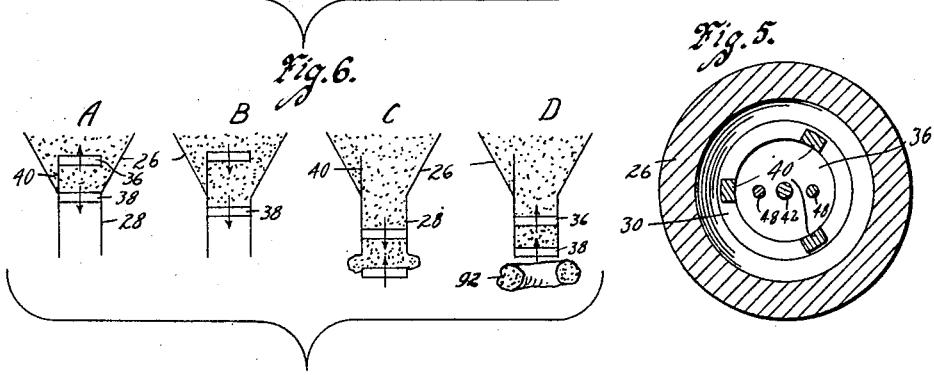

Patented May 3, 1932

1,856,511

UNITED STATES PATENT OFFICE

FRED L. SCHOEL, OF WATERLOO, IOWA, ASSIGNOR TO GEM DOUGHNUT MACHINE CO., INC., OF WATERLOO, IOWA, A CORPORATION

ADJUSTABLE DOUGH DISPENSING MACHINE

Application filed June 15, 1931. Serial No. 544,525.

One object of my invention is to provide an adjustable dough dispensing machine of simple, durable and inexpensive construction.

A further object of my present invention is to provide an improved type of adjustment for dough dispensing machines which may be easily adjusted while the machine is in operation and which is an improvement over the adjustment shown in my copending application Serial Number 444,290, filed April 4, 1930, which issued into Patent No. 1,811,564 on June 23, 1931.

More particularly it is my object to provide in a dough dispensing machine having a dough hopper and a pair of movable members for dispensing dough from the hopper, an arm operatively connected with each movable member, a drive shaft, means thereon coacting with the arms for moving them upon rotation of the shaft and individual bearing members for each arm, the arms being pivoted thereto and the bearing members being capable of movement transversely of the arms to vary the strokes of the movable members without affecting the leverage of the arms, such variation in the strokes of the movable members being provided for the purpose of changing the sizes of the charges of dough dispensed from the hopper.

Still a further object is to provide a readily operable means for adjusting the bearing members to which the arms are pivoted and to provide for their simultaneous adjustment if such construction is desirable.

Still another object is to provide means for locking the bearing members in any desired position to which they are adjusted.

Still another object is to provide a cylindrical guide with guide extensions for the movable members so that when certain adjustments are made, the parts do not become longitudinally disassociated.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of a dough dispensing machine embodying my present invention.

Figure 2 is an enlarged, vertical sectional view on the line 2—2 of Figure 1 showing the coaction of cams with arms which operate to dispense dough from the machine.

Figure 3 is a vertical view on the line 3—3 of Figure 1 showing the adjustable parts in detail.

Figure 4 is a vertical sectional view longitudinally of the dough dispensing machine as on the line 4—4 of Figure 2, showing a cam, its coaction with one of the arms and the movable members for dispensing dough from the dough hopper.

Figure 5 is a sectional view on the line 5—5 of Figure 4 showing a guide construction for the movable members.

Figure 6 is a diagrammatic view showing the operation of the dough dispensing machine and adjusted to one position.

Figure 7 is a similar diagrammatic view showing the parts adjusted to another position; and Figure 8 is a sectional view similar to the left hand end of Figure 4 showing a modified construction.

On the accompanying drawings, I have used the reference numeral 10 to indicate a supporting bracket. The bracket 10 may be secured to a wall surface or the like. Pivotally mounted supporting arms 12 extend from the bracket 10 and support a cam housing 14.

A drive shaft 16 is journalled in the housing 14 and may be rotated by a hand crank 18 or an electric motor as shown in my copending application hereinbefore referred to. The drive shaft 16 has a pair of cams 20 and 22 secured thereto as best shown in Figure 2 of the drawings.

A hopper supporting ring 24 is secured to the housing 14 and supports a dough hopper 26. The hopper 26 has a discharge neck 28 in which is removably mounted a cylindrical guide 30. By means of a peripheral groove 32 and a set screw 34 the cylindrical guide 30 may be secured in position within the discharge neck 28.

Movable members or pistons 36 and 38 reciprocate through the cylindrical guide 30 and at times during certain adjustments of the machine the piston 36 is withdrawn upwardly from the cylindrical guide 30. Guide extensions 40 are therefore provided, extending upwardly from the cylindrical guide 30 and located within the hopper 26. These guide the piston 36 when it is above the upper end of the cylindrical guide 30.

Different sized cylindrical guides 30 or dies, as they are ordinarily called, may be substituted in place of the one shown and the pistons 36 and 38 replaced by others of suitable size for the purpose of regulating the sizes of the charges of dough dispensed (which are dispensed in the form of doughnuts).

A piston rod 42 is connected with the piston 38 and is slidable through a bearing 44 in a supporting arm 46. The arm 46 extends from the housing 14. A pair of piston rods 48 extend upwardly from the piston 36. The piston rods 48 are connected with a block 50 while the piston rod 42 is connected with a block 52. The piston rod 42 slidably extends through the piston 36. The blocks 50 and 52 have laterally extending pins 54 and 56 respectively with which forked ends of arms 58 and 60 coact. The arms 58 and 60 are pivoted on pins 62 and 64 respectively. The arms have rollers 66 and 68 journalled on stud pins 66a and 68a. The rollers 66 and 68 coact with the cam grooves of the cams 22 as best shown in Figure 2.

The pivot pins 62 and 64 are supported in U-shaped brackets or bearings 70 and 72 respectively which snugly fit within the casing 14 as best shown in Figure 3 of the drawings. These bearings are movable transversely with respect to the arms 58 and 60 and the pivot pins 62 and 64 have threaded extensions 74 and 76 for locking them in adjusted positions. The extensions 74 and 76 extend through slots 78 in the housing 14 and are provided with wing nuts 80 for retaining the bearings 70 and 72 in any desired position when the wing nuts are tightened.

For adjusting the positions of the bearings 70 and 72 I provide screw threaded extensions 82 with which adjusting nuts 84 screw threadedly coact. The adjusting nuts 84 are held against longitudinal movement relative to the housing 14 by shoulders 86.

In Figure 6 I have shown the upper and lower pistons 36 and 38 in their various positions during a cycle of operation of the machine. At "A" the piston 36 is moving upwardly and the piston 38 is moving downwardly, which draws dough in between the pistons. They then both move downwardly as at "B" for moving the charge of dough downwardly through the cylindrical guide 30 to the position shown at "C". After a slight dwell of the piston 38 in lowered position because of the dwell portion 22a of the cam 22, during which the upper piston 36 moves downwardly to force the dough out as shown in "C", the piston 38 moves upwardly for cutting the doughnut off as in "D". The doughnut, after being cut off, is indicated at 88, then drops as indicated at 90, into the vat of hot grease provided for frying it.

Without adjusting the bearing 72 for the lower arm 60 the volume in the doughnut can be increased by adjusting only the bearing 70 downwardly so that the piston 36 is in a higher relative position as shown in Figure 7.

In Figure 7 the various views are indicated at A, B, C and D, the same as in Figure 6. It will be noted that the distance between the pistons 36 and 38 in all of their positions is greater than in Figure 6. This causes the dispensing of the doughnut 92 of approximately the same internal diameter, but of greater volume. The internal diameter can be changed by changing the die 30 and the pistons 36 and 38.

I have found the disclosed type of adjustment particularly desirable because it does not change the effective leverage of the arms 58 and 60 but only changes the position of the stroke of the piston. The length of the stroke is between certain limits at one adjustment, and is of the same length but between higher or lower limits at other adjustments.

In Figure 7 I have shown a difference of adjustment over Figure 6 of the upper piston only but it is obvious that the lower one can also be adjusted whereby the volume of the doughnut 92 may be made still greater.

In Figure 8 I have shown bearing members 70a and 72a corresponding to the bearings 70 and 72 as being of a little different formation and having screw threaded openings therethrough. A control rod 94 is journalled at 96 and 98 in the housing 14. Longitudinal movement thereof is prevented by a collar 100 and an adjusting nut 102. The control rod 94 has right and left hand threads coacting with the bearing members 70a and 72a whereby they are simultaneously adjusted in opposite directions. This eliminates one adjustment control although it provides an adjustment without the flexibility of the one shown in Figure 4 wherein the arms 58 and 60 are individually adjustable as desired.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a dough dispensing machine having a dough hopper and a reciprocable member for dispensing dough therefrom, a shaft, a cam thereon, an arm pivotally connected with said reciprocable member and arranged at substantially right angles thereto, the cam surface of said cam coacting with said arm intermediate the ends thereof to move the same upon rotation of the shaft, a bearing member, one end of said arm being pivoted thereto, said bearing member being movable in a direction substantially parallel with the direction of movement of the reciprocable member to vary the pivot point of said arm relative to said cam and to thereby vary the stroke of said reciprocable member substantially without varying the distances between the pivot point, the cam and the reciprocable member.

2. In a dough dispensing machine, a dough hopper, a pair of reciprocable members for dispensing charges of dough from said hopper, an arm operatively connected with each reciprocable member, a shaft, means thereon coacting with each arm to move them upon rotation of the shaft, bearing members, one end of each arm being pivoted thereto, said bearing members being capable of movement in directions substantially parallel with the direction of the movement of the reciprocable members to vary the strokes of said reciprocable members substantially without varying the distances between the pivot points, the cams and the reciprocable members.

3. In a dough dispensing machine, a dough hopper, a pair of reciprocable members for dispensing charges of dough therefrom, an arm operatively connected with each reciprocable member, a shaft, means thereon for coacting with each arm to move them upon rotation of said shaft, a bearing member, one end of one of said arms being pivoted thereto, said bearing member being capable of movement in a direction substantially parallel with the direction of movement of said reciprocable member to vary the stroke of said arm relative to said means substantially without varying the distances between the pivot point, the means and said reciprocable member.

4. In a dough dispensing machine having a dough hopper and a movable member for dispensing dough therefrom, a shaft, an arm having one end pivotally connected with said movable member, means on said shaft and coacting with said arm to move the same upon rotation of the shaft, a bearing member, the other end of said arm being pivoted thereto, said bearing member being movable transversely relative to said arm to vary the pivot point of said arm relative to said means and thereby vary the movement of said movable member substantially without varying the distances between the pivot point, the means and said reciprocable member.

5. In a dough dispensing machine, a dough hopper, a pair of movable members for dispensing charges of dough therefrom, an arm having one end operatively connected with each movable member, a shaft, means thereon for coacting with each arm to move them upon rotation of said shaft, bearing members, the other end of each arm being pivoted thereto, said bearing members being capable of movement transversely of said arms to vary the strokes of said movable members substantially without changing the distances between the means, the bearing members and the movable members.

6. A dough dispensing machine, comprising a dough hopper, a pair of movable members for dispensing charges of dough from said hopper, an arm operatively connected with each movable member, a shaft, means thereon for coacting with each arm to move them upon rotation of the shaft, a bearing member, one end of one of said arms being pivoted thereto, said bearing member being capable of movement transversely of said arm to vary the stroke of the movable member connected therewith substantially without changing the distances between said bearing member, said means and said movable member.

7. In a dough dispensing machine, a dough hopper, a pair of movable members for dispensing charges of dough therefrom, an arm having one end operatively connected with each movable member, a shaft, means thereon coacting with each arm to move the arms upon rotation of the shaft, bearing members, the other end of each arm being pivoted thereto, said bearing members being capable of simultaneous movement transversely of said arms and in opposite directions to vary the strokes of said movable members substantially without changing the distances between said bearings, said means and said movable members.

Des Moines, Iowa, May 29th, 1931.
FRED L. SCHOEL.